(12) United States Patent
Tanaka (10) Patent No.: US 8,792,030 B2
(45) Date of Patent: Jul. 29, 2014

(54) SOLID-STATE IMAGING APPARATUS, IMAGE PROCESSING APPARATUS, AND CAMERA SYSTEM

(71) Applicant: Panasonic Corporation, Kadoma (JP)

(72) Inventor: Nozomi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 103 days.

(21) Appl. No.: 13/679,598

(22) Filed: Nov. 16, 2012

(65) Prior Publication Data

US 2013/0076948 A1 Mar. 28, 2013

Related U.S. Application Data

(63) Continuation of application No. PCT/JP2011/001920, filed on Mar. 30, 2011.

(30) Foreign Application Priority Data

May 19, 2010 (JP) .................................. 2010-115103

(51) Int. Cl.
*H04N 5/335* (2011.01)

(52) U.S. Cl.
USPC ........................................ 348/281; 348/222.1

(58) Field of Classification Search
USPC ............................................. 348/222.1, 281
See application file for complete search history.

(56) References Cited

U.S. PATENT DOCUMENTS

| | | |
|---|---|---|
| 2003/0184661 A1 | 10/2003 | Yubata et al. |
| 2005/0168602 A1 | 8/2005 | Sumi et al. |
| 2008/0218619 A1 | 9/2008 | Egawa |
| 2011/0025420 A1 | 2/2011 | Sumi et al. |
| 2011/0228130 A1 | 9/2011 | Egawa |
| 2011/0228152 A1 | 9/2011 | Egawa |
| 2012/0104235 A1 | 5/2012 | Sumi et al. |

FOREIGN PATENT DOCUMENTS

| | | |
|---|---|---|
| JP | 2002-218320 A | 8/2002 |
| JP | 2002-218320 A | 8/2002 |
| JP | 2003-283930 A | 10/2003 |
| JP | 2005-175517 A | 6/2005 |
| JP | 2008-124842 A | 5/2008 |
| JP | 2008-136043 A | 6/2008 |
| JP | 2008-136043 A | 6/2008 |
| JP | 2009-033305 A | 2/2009 |
| JP | 2009-033305 A | 2/2009 |

OTHER PUBLICATIONS

International Search Report issued in International Patent Application PCT/JP2011/001920 dated Apr. 26, 2011.

*Primary Examiner* — Usman Khan
(74) *Attorney, Agent, or Firm* — McDermott Will & Emery LLP (57) ABSTRACT

An imaging section outputs n pixel signals every pixel row of n×m pixels, and n AD conversion sections, corresponding to n pixel columns of the n×m pixels, convert the n pixel signals to n pixel values. A resolution control section controls the n AD conversion sections so that the AD conversion resolution of the n AD conversion sections become a first resolution, or a second resolution rougher than the first resolution, based on the AD conversion resolution of the n AD conversion sections and the n pixel values.

11 Claims, 10 Drawing Sheets

|  | (MEMO)<br>D1 |  | (DATA)<br>D1 |  |
|---|---|---|---|---|
| 1ST ROW ... | 980 | ×1 → | 980 | |
| 2ND ROW ... | (1010) | ×1 → | 1010 | |
| 3RD ROW ... | 690 | ×2 → | 1380 | Dtha=1000 |
| 4TH ROW ... | 710 | ×2 → | 1420 | Dthb=500 |
| 5TH ROW ... | 640 | ×2 → | 1280 | L=3 |
| 6TH ROW ... | 520 | ×2 → | 1040 | |
| 7TH ROW ... | (480) | ×2 → | 960 | |
| 8TH ROW ... | (490) | ×2 → | 980 | |
| 9TH ROW ... | (460) | ×2 → | 920 | |
| 10TH ROW ... | 920 | ×1 → | 920 | |

FIG.10

SOLID-STATE IMAGING APPARATUS, IMAGE PROCESSING APPARATUS, AND CAMERA SYSTEM

CROSS-REFERENCE TO RELATED APPLICATION

This is a continuation of PCT International Application PCT/JP2011/001920 filed on Mar. 30, 2011, which claims priority to Japanese Patent Application No. 2010-115103 filed on May 19, 2010. The disclosures of these applications including the specifications, the drawings, and the claims are hereby incorporated by reference in their entirety.

BACKGROUND

The present disclosure relates to a solid-state imaging apparatus including an imaging section having a plurality of pixels arranged in a matrix.

As solid-state imaging apparatuses that detect light input from outside and output an electrical signal, CCD-type and MOS-type image sensors are mainly used. Methods for expanding the dynamic range of a MOS image sensor, for example, are described in Japanese Patent Publication No. 2005-175517 (Patent Document 1) and Japanese Patent Publication No. 2008-124842 (Patent Document 2).

SUMMARY

In the technique of Patent Document 1, to expand the dynamic range by M bits, an Mbit signal representing gain information is required separately from signal output. In the technique of Patent Document 2, where a pixel signal is AD-converted a plurality of times by varying the resolution and a plurality of AD-converted signals are combined, to expand the dynamic range, line memories for storing the signals to be combined and circuits for combining the signals are necessary, increasing the circuit scale.

In view of the above, it is an objective of the present disclosure to provide a solid-state imaging apparatus with a simple configuration capable of expanding the dynamic range while maintaining good S/N.

According to one aspect of the present disclosure, the solid-state imaging apparatus includes: an imaging section having n×m pixels arranged in a matrix each configured to store a charge corresponding to incident light, the imaging section outputting, every pixel row of the n×m pixels, n pixel signals corresponding to charges stored in n pixels belonging to the pixel row; a reference signal supply section configured to supply a ramp signal and capable of changing the gradient of the ramp signal; n AD conversion sections corresponding to n pixel columns of the n×m pixels, each configured to count the time taken until the signal level of the ramp signal from the reference signal supply section reaches the signal level of the pixel signal from the corresponding pixel column, thereby converting the pixel signal to a pixel value; and a resolution control section configured to control the reference signal supply section so that, in the case that the gradient of the ramp signal is a first gradient, the gradient be changed to a second gradient steeper than the first gradient when having detected a pixel value larger than a first threshold among the n pixel values obtained by the n AD conversion sections, and control the reference signal supply section so that, in the case that the gradient of the ramp signal is the second gradient, the gradient be changed to the first gradient when having detected that the maximum pixel value among the n pixel values obtained by the n AD conversion sections is smaller than a second threshold that is smaller than the first threshold.

In the solid-state imaging apparatus described above, while good S/N is maintained when the signal level of the pixel signals is lower than a threshold voltage corresponding to the first threshold (e.g., in low-luminance portions of the pixel signals), the dynamic range can be expanded when the signal level of the pixel signals is higher than the threshold voltage (e.g., in high-luminance portions of the pixel signals). Also, since it is possible to detect the resolution of the AD conversion sections (which the gradient of the ramp signal is, the first gradient or the second gradient) based on a specific pixel value (e.g., a pixel value corresponding to an OB pixel) itself among the n pixel values, it is unnecessary to provide a signal line for output of resolution information (information on the resolution of the AD conversion sections). Thus, the configuration of the solid-state imaging apparatus can be simplified.

According to another aspect of the present disclosure, the solid-state imaging apparatus includes: an imaging section having n×m pixels arranged in a matrix each configured to store a charge corresponding to incident light, the imaging section outputting, every pixel row of the n×m pixels, n pixel signals corresponding to charges stored in n pixels belonging to the pixel row; a reference signal supply section configured to supply n ramp signals and capable of changing the gradient of each of the n ramp signals; n AD conversion sections corresponding to n pixel columns of the n×m pixels, each configured to count the time taken until the signal level of the corresponding ramp signal among the n ramp signals reaches the signal level of the pixel signal from the corresponding pixel column, thereby converting the pixel signal to a pixel value; and a resolution control section configured to control the reference signal supply section for each of the n AD conversion sections so that, in the case that the gradient of the ramp signal corresponding to the AD conversion section is a first gradient, the gradient be changed to a second gradient steeper than the first gradient when having detected that the pixel value obtained by the AD conversion section is larger than a first threshold, and control the reference signal supply section so that, in the case that the gradient of the ramp signal corresponding to the AD conversion section is the second gradient, the gradient be changed to the first gradient when having detected that the pixel value obtained by the AD conversion section is smaller than a second threshold that is smaller than the first threshold.

In the solid-state imaging apparatus described above, while good S/N is maintained when the signal level of the pixel signals is lower than a threshold voltage corresponding to the first threshold (e.g., in low-luminance portions of the pixel signals), the dynamic range can be expanded when the signal level of the pixel signals is higher than the threshold voltage (e.g., in high-luminance portions of the pixel signals). Also, since it is possible to detect the resolution of the AD conversion sections (which the gradient of the ramp signal is, the first gradient or the second gradient) based on a specific pixel value (e.g., a pixel value corresponding to an OB pixel) itself among the n pixel values, it is unnecessary to provide a signal line for output of resolution information (information on the resolution of the AD conversion sections). Thus, the configuration of the solid-state imaging apparatus can be simplified.

According to yet another aspect of the present disclosure, the solid-state imaging apparatus includes: an imaging section having n×m pixels arranged in a matrix each configured to store a charge corresponding to incident light, the imaging section outputting, every pixel row of the n×m pixels, n pixel signals corresponding to charges stored in n pixels belonging to the pixel row; n AD conversion sections corresponding to n pixel columns of the n×m pixels, each configured to convert the pixel signal from the corresponding pixel column to a pixel value and capable of changing AD conversion resolution; and a resolution control section configured to control the n AD conversion sections so that, in the case that the AD conversion resolution of the n AD conversion sections is a first resolution, the AD conversion resolution be changed to a second resolution rougher than the first resolution when having detected a pixel value larger than a first threshold among the n pixel values obtained by the n AD conversion sections, and control the n AD conversion sections so that, in the case that the AD conversion resolution of the n AD conversion sections is a second resolution, the AD conversion resolution be changed to the first resolution when having detected that the maximum pixel value among the n pixel values obtained by the n AD conversion sections is smaller than a second threshold that is smaller than the first threshold.

In the solid-state imaging apparatus described above, while good S/N is maintained when the signal level of the pixel signals is lower than a threshold voltage corresponding to the first threshold, the dynamic range can be expanded when the signal level of the pixel signals is higher than the threshold voltage. Also, since it is possible to detect the resolution of the AD conversion sections based on a specific pixel value itself among the n pixel values, it is unnecessary to provide a signal line for output of resolution information (information on the resolution of the AD conversion sections). Thus, the configuration of the solid-state imaging apparatus can be simplified.

DETAILED DESCRIPTION

Embodiments of the present disclosure will be described hereinafter with reference to the accompanying drawings. Note that the embodiments to be described herein are merely illustrative and can be modified in various ways.

First Embodiment

Figure 1:
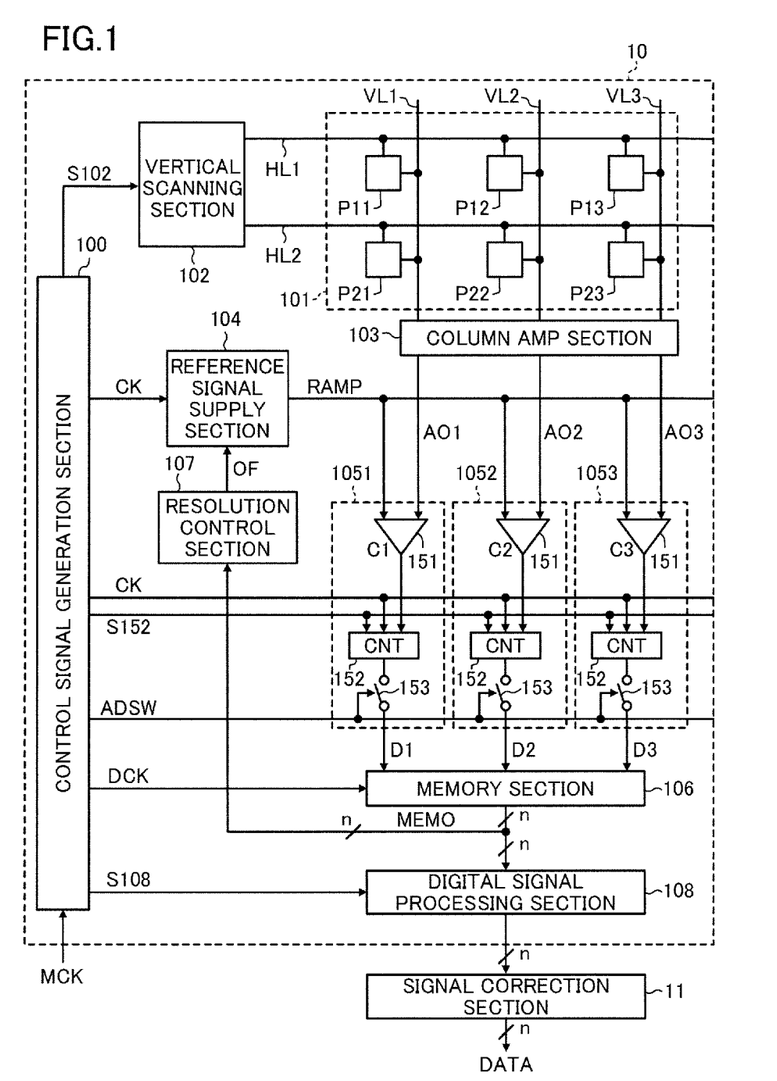
FIG. 1 is a view showing an example configuration of an image processing apparatus of the first embodiment.

FIG. 1 shows an example configuration of an image processing apparatus of the first embodiment. The image processing apparatus includes a solid-state imaging apparatus 10 and a signal correction section 11. The solid-state imaging apparatus 10 includes a control signal generation section 100, an imaging section 101, a vertical scanning section 102, a column amp section 103, a reference signal supply section 104, n (n=3 in the illustrated example) AD conversion sections 1051 to 1053, a memory section 106, a resolution control section 107, and a digital signal processing section 108.

[Control Signal Generation Section]

The control signal generation section 100 controls the vertical scanning section 102, the AD conversion sections 1051 to 1053, and the digital signal processing section 108. Also, the control signal generation section 100 generates a clock CK and a transfer clock DCK based on a master clock MCK, and supplies the clock CK to the reference signal supply section 104 and the AD conversion sections 1051 to 1053 and the transfer clock DCK to the memory section 106.

[Imaging Section]

The imaging section 101 has n×m (n=3 and m=2 in the illustrated example) pixels P11 to P23 arranged in a matrix on a semiconductor substrate. Each of the pixels P11 to P23 stores a charge corresponding to incident light, and includes a photoelectric conversion portion that converts incident light to a charge, a storage portion that stores the charge obtained by the photoelectric conversion portion, etc., for example.

Figure 2:
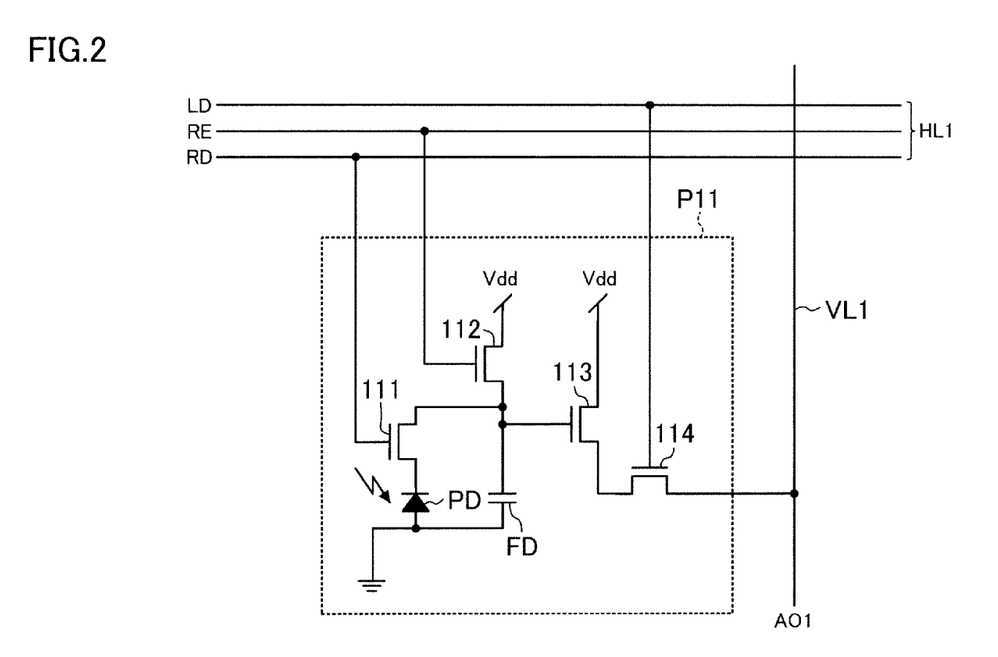
FIG. 2 is a view showing an example configuration of a pixel.

As shown in FIG. 2, the pixel P11 may include a photodiode PD, a floating diffusion element FD, a read selection transistor 111, a reset transistor 112, an amplifier transistor 113, and a row selection transistor 114. A row selection signal LD, a reset signal RE, and a read signal RD are supplied to the pixel P11 from the vertical scanning section 102 through a horizontal control line HL1. A pixel signal AO1 corresponding to the charge stored in the pixel P11 is output to a vertical signal line VL1. Although the pixel P11 is of a 4TR configuration having four transistors, it may be of a 3TR configuration having three transistors or of any other configuration. The pixels P12 to P23 each have a configuration similar to that of the pixel P11.

[Vertical Scanning Section]

The vertical scanning section 102 supplies the control signals (the row selection signal LD, the reset signal RE, and the read signal RD) to the pixels P11 to P23 through the horizontal control lines HL1 and HL2 in response to a control signal S102 from the control signal generation section 100, to control the pixels P11 to P23. For example, the vertical scanning section 102 executes selection of the pixel row, control of the storing time, control of read operation, etc.

[Column Amp Section]

The column amp section 103 supplies n (n=3 in the illustrated example) pixel signals AO1 to AO3 (n pixel signals from n pixels belonging to the pixel row selected by the vertical scanning section 102) received through n vertical signal lines VL1 to VL3 to the AD conversion sections 1051 to 1053, respectively.

[Reference Signal Supply Section]

The reference signal supply section 104 supplies a ramp signal RAMP in synchronization with the clock CK from the control signal generation section 100. The reference signal supply section 104 is constituted by a DA converter, for example, and changes the gradient of the ramp signal RAMP in response to control by the resolution control section 107 (an overflow detection signal OF in the illustrated example). By changing the gradient of the ramp signal RAMP, the resolution (bit count) of the AD conversion sections 1051 to 1053 changes.

[AD Conversion Sections]

The AD conversion sections 1051 to 1053 respectively correspond to the vertical signal lines VL1 to VL3 (three pixel columns of the pixels P11 to P23). The AD conversion sections 1051 to 1053 count the time taken until the signal level of the ramp signal RAMP reaches the signal levels of the pixel signals AO1 to AO3, respectively, whereby the pixel signals AO1 to AO3 are converted to pixel values D1 to D3 (digital values). Each of the AD conversion sections 1051 to 1053 may include a voltage comparator 151, a counter 152, and a switch 153, for example. The voltage comparator 151 compares the signal level of the pixel signal (AO1, AO2, or AO3) with the signal level of the ramp signal RAMP. The counter 152 executes counting in parallel with the comparison by the voltage comparator 151, and outputs the count value at the time when the comparison result (an output signal C1, C2, or C3) from the voltage comparator 151 is inverted, as a pixel value (D1, D2, or D3). Also, the counter 152 executes counting-down or counting-up in response to an up/down switch signal S152 from the control signal generation section 100. The switch 153 transfers the count value (pixel value) from the counter 152 to the memory section 106 in response to a memory transfer signal ADSW from the control signal generation section 100.

[Read Operation]

Figure 3:
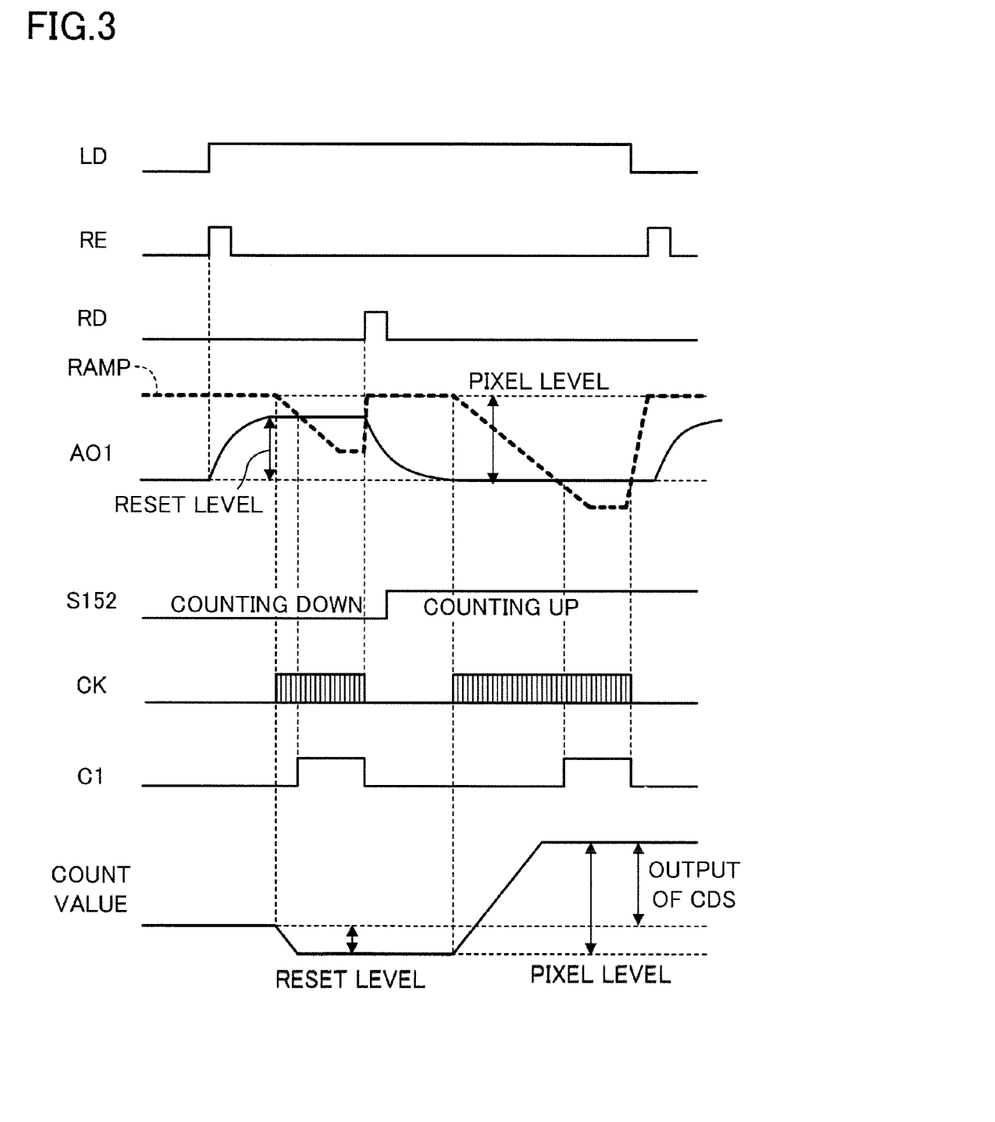
FIG. 3 is a view for explaining read operation by a solid-state imaging apparatus.

Next, referring to FIG. 3, the read operation of the solid-state imaging apparatus 10 shown in FIG. 1 will be described. Note that description will be made using the first pixel row (the pixels P11 to P13) as the object to be read. Note also that, since the pixels P11 to P13, and the AD conversion sections 1051 to 1053, perform similar processing to one another, the following description will be made using the pixel P11 and the AD conversion section 1051 as the respective examples for simplicity of description.

First, the vertical scanning section 102 supplies the row selection signal LD to the pixels P11 to P13 through the horizontal control line HL1, whereby, in the pixel P11, the row selection transistor 114 is turned on. Thereafter, the vertical scanning section 102 supplies the reset signal RE to the pixels P11 to P13 through the horizontal control line HL1, whereby, in the pixel P11, the reset transistor 112 is turned on, to set the voltage level of the floating diffusion element FD to its reset level. This also causes the pixel signal AO1 corresponding to the reset level of the floating diffusion element FD to be supplied to the AD conversion section 1051 through the vertical signal line VL1 and the column amp section 103.

Then, the reference signal supply section 104 gradually decreases the signal level of the ramp signal RAMP. The voltage comparator 151 of the AD conversion section 1051 switches the level of the output signal C1 from low to high when the signal level of the ramp signal RAMP reaches the signal level of the pixel signal AO1. Also, the control signal generation section 100 supplies the up/down switch signal S152 to the AD conversion sections 1051 to 1053, to instruct the AD conversion sections 1051 to 1053 to start counting-down. The counter 152 of the AD conversion section 1051 executes counting-down in synchronization with the clock CK from the control signal generation section 100, and stops counting when the level of the output signal C1 changes from low to high. Thus, the counter 152 of the AD conversion section 1051 holds the count value corresponding to the reset level of the floating diffusion element FD of the pixel P11.

Thereafter, the vertical scanning section 102 stops the supply of the reset signal RE to the pixels P11 to P13 and supplies the read signal RD to the pixels P11 to P13. This turns off the reset transistor 112 and turns on the read selection transistor 111 in the pixel P11. As a result, the charge stored in the photodiode PD is transferred to the floating diffusion element FD, and the pixel signal AO1 corresponding to the voltage level of the floating diffusion element FD (pixel signal corresponding to the pixel level) is supplied to the AD conversion section 1051 through the vertical signal line VL1 and the column amp section 103.

Then, the reference signal supply section 104 gradually decreases the signal level of the ramp signal RAMP, and the voltage comparator 151 of the AD conversion section 1051 switches the level of the output signal C1 from low to high when the signal level of the ramp signal RAMP reaches the signal level of the pixel signal AO1. Also, the control signal generation section 100 supplies the up/down switch signal S152 to the AD conversion sections 1051 to 1053, to instruct the AD conversion sections 1051 to 1053 to start counting-up. The counter 152 of the AD conversion section 1051 executes counting-up in synchronization with the clock CK from the control signal generation section 100, and stops counting when the level of the output signal C1 changes from low to high. Thus, the counter 152 of the AD conversion section 1051 holds the count value corresponding to the voltage level obtained by subtracting the reset level of the floating diffusion element FD from the pixel level of the pixel P11, as the pixel value D1. In this way, correlation double sampling processing is performed.

[Memory Section]

The memory section 106 holds the pixel values D1 to D3 (the pixel values of one pixel row) obtained by the AD conversion sections 1051 to 1053, and outputs the pixel values D1 to D3 sequentially as an image signal MEMO in response to the transfer clock DCK from the control signal generation section 100.

[Resolution Control Section]

The resolution control section 107 controls the reference signal supply section 104 in the following manner. In the case that the gradient of the ramp signal RAMP is R1, when having detected a pixel value larger than a preset threshold Dtha, among the pixel values D1 to D3 (the pixel values of one pixel row) supplied as the image signal MEMO, the resolution control section 107 controls the reference signal supply section 104 so that the gradient of the ramp signal RAMP be changed to R2 (a gradient steeper than R1). Also, in the case that the gradient of the ramp signal RAMP is R2, when having detected that the maximum pixel value among the pixel values D1 to D3 supplied as the image signal MEMO is smaller than a preset threshold Dthb (threshold smaller than the threshold Dtha), the resolution control section 107 controls the reference signal supply section 104 so that the gradient of the ramp signal RAMP be changed to R1.

[Overflow Determination Processing]

For example, the reference signal supply section 104 may set the gradient of the ramp signal RAMP at R1 when the level of the overflow detection signal OF is low, and set at R2 when the level of the overflow detection signal OF is high. In this case, the resolution control section 107 may perform the following overflow determination processing. First, the resolution control section 107 sets the overflow detection signal OF at the low level, to allow the reference signal supply section 104 to set the gradient of the ramp signal RAMP at R1. Thereafter, the resolution control section 107 compares the pixel values D1 to D3 supplied as the image signal MEMO with the threshold Dtha sequentially, and when having detected a pixel value larger than the threshold Dtha, switches the level of the overflow detection signal OF from low to high, to allow the reference signal supply section 104 to switch the gradient of the ramp signal RAMP from R1 to R2. Thereafter, when having detected that the maximum pixel value among the pixel values D1 to D3 supplied as the image signal MEMO is smaller than the threshold Dthb, the resolution control section 107 switches the level of the overflow detection signal OF from high to low, to allow the reference signal supply section 104 to switch the gradient of the ramp signal RAMP from R2 to R1.

[Gradient of Ramp Signal]

Figure 4:
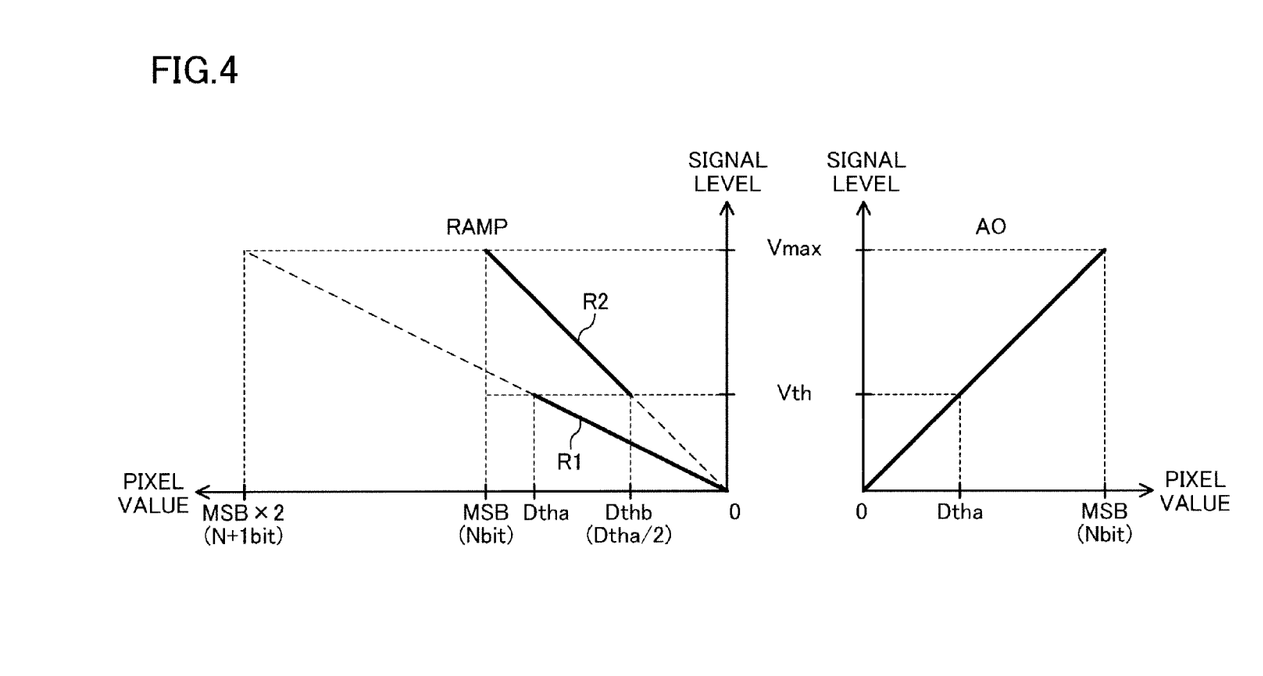
FIG. 4 is a view for explaining gradients of a ramp signal.

As shown in FIG. 4, when the resolution of the AD conversion sections 1051 to 1053 is "N bits," the gradient R1 may be set so that the saturation voltage Vmax of the AD conversion sections 1051 to 1053 be expressed by (N+1) bits, and the gradient R2 may be set so that the saturation voltage Vmax of the AD conversion sections 1051 to 1053 be expressed by N bits. When the gradient of the ramp signal RAMP is R2, the resolution (bit count) of the AD conversion sections 1051 to 1053 is a half of that obtained when the gradient of the ramp signal RAMP is R1. In other words, when the signal level of the pixel signals AO1 to AO3 is a constant value, the pixel values D1 to D3 obtained when the gradient of the ramp signal RAMP is R2 are a half of the pixel values D1 to D3 obtained when the gradient of the ramp signal RAMP is R1. Also, in FIG. 4, the threshold Dthb is a half of the threshold Dtha. In other words, the gradient of the ramp signal RAMP is set at R1 when the signal level of the pixel signals AO1 to AO3 is lower than a threshold voltage Vth corresponding to the threshold Dtha, and set at R2 when the signal level of the pixel signals AO1 to AO3 is higher than the threshold voltage Vth.

[Digital Signal Processing Section]

The digital signal processing section 108 performs digital gain operation and various types of correction processing for the image signal MEMO from the memory section 106 in response to a control signal S108 from the control signal generation section 100, and supplies the resultant signal to the signal correction section 11.

[Signal Correction Section]

The signal correction section 11 detects which the gradient of the ramp signal RAMP (the gradient at the time when the pixel values D1 to D3 are obtained) is, R1 or R2, based on a specific pixel value itself among the pixel values D1 to D3 (the pixel values of one pixel row) supplied as the image signal MEMO from the solid-state imaging apparatus (specifically, from the digital signal processing section 108). Also, the signal correction section 11 corrects the pixel values D1 to D3 according to the gradient of the ramp signal RAMP, and outputs the result as an image signal DATA.

For example, in the case of FIG. 4, the resolution (bit count) of the AD conversion sections 1051 to 1053 is (N+1) bits when the gradient of the ramp signal RAMP is R1, and it is N bits when the gradient of the ramp signal RAMP is R2. In this case, when the gradient of the ramp signal RAMP is R1, the signal correction section 11 multiplies the pixel values D1 to D3 supplied as the image signal MEMO from the solid-state imaging apparatus 10 by "1," and outputs the result as the image signal DATA (i.e., outputs the pixel values D1 to D3 as they are as the image data DATA). When the gradient of the ramp signal RAMP is R2, the signal correction section 11 multiplies the pixel values D1 to D3 supplied as the image signal MEMO from the solid-state imaging apparatus 10 by "2," and outputs the result as the image signal DATA. In this way, the (N+1)-bit image signal DATA can be obtained.

[Detection of Gradient of Ramp Signal]

Figure 5:
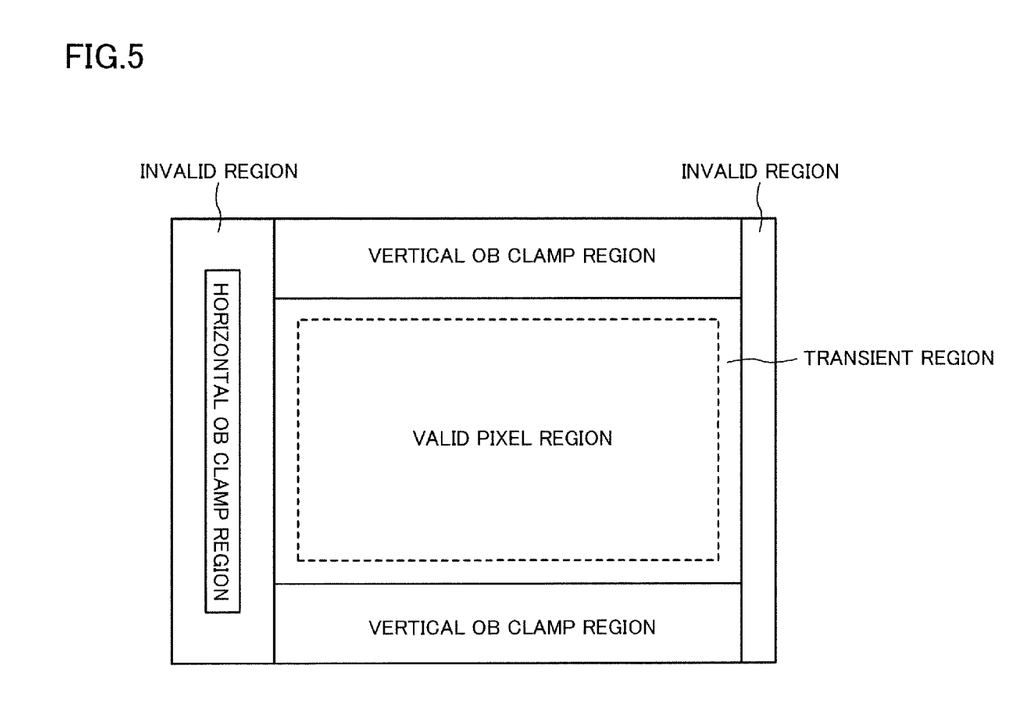
FIG. 5 is a view for explaining arrangement of pixels.

As shown in FIG. 5, the imaging section 101 may have a valid pixel region, a transient region, invalid regions, vertical OB clamp regions, and a horizontal OB clamp region. While the pixel values corresponding to the pixels arranged in the valid pixel region are used as the final output image, pixels arranged in the invalid regions are not provided with a photodiode. In the vertical OB clamp regions and the horizontal OB clamp region, light-shaded pixels (vertical OB pixels and horizontal OB pixels) are arranged. The pixel values corresponding to the vertical OB pixels and the horizontal OB pixels are used for OB clamping processing and image correction processing. Generally, the pixel values corresponding to the vertical OB pixels and the horizontal OB pixels correspond to a signal level obtained by adding (or subtracting) a noise component to (or from) the DC level determined by the circuit design. Therefore, it is possible to detect which the gradient of the ramp signal RAMP is, R1 or R2, based on a pixel value corresponding to a horizontal OB pixel.

In the case that the gradients R1 and R2 of the ramp signal RAMP have the relationship shown in FIG. 4, if the pixel value corresponding to the horizontal OB pixel is "D1" when the gradient of the ramp signal RAMP is R1, it is "D1/2" when the gradient of the ramp signal RAMP is R2. Using this fact, when the pixel value corresponding to the horizontal OB pixel in the x-th row is "D1±α" (α is an allowance of error in the gradient detection due to pixel variations, noise, etc.), the signal correction section 11 may detect that the gradient of the ramp signal RAMP is R1, and output the pixel values D1 to D3 corresponding to the x-th pixel row as they are as the image signal DATA. When the pixel value corresponding to the horizontal OB pixel in the x-th row is "D1/2±β" (β is an allowance of error in the gradient detection due to pixel variations, noise, etc.), the signal correction section 11 may detect that the gradient of the ramp signal RAMP is R2, multiply the pixel values D1 to D3 corresponding to the x-th pixel row by "2," and output the result as the image signal DATA.

Thus, the gradient of the ramp signal RAMP at the time when the pixel values D1 to D3 corresponding to the x-th pixel row are obtained can be detected based on a specific pixel value itself among the pixel values D1 to D3 corresponding to the x-th pixel row (the pixel values corresponding to one pixel row).

As described above, while good S/N is maintained when the signal level of the pixel signals AO1 to AO3 is lower than the threshold voltage Vth (e.g., in low-luminance portions of the pixel signals AO1 to AO3), the dynamic range can be expanded when the signal level of the pixel signals AO1 to AO3 is higher than the threshold voltage Vth (e.g., in high-luminance portions of the pixel signals AO1 to AO3).

Also, since the resolution of the AD conversion sections 1051 to 1053 (which the gradient of the ramp signal is, R1 or R2) can be detected based on a specific pixel value itself among the pixel values D1 to D3, it is unnecessary to provide a signal line for output of resolution information (information on the resolution of the AD conversion sections 1051 to 1053). Thus, the configuration of the solid-state imaging apparatus 10 can be simplified.

[Hysteresis Characteristic]

When the maximum pixel value among the pixel values D1 to D3 (the pixel values of one pixel row) is near the threshold Dtha for a plurality of consecutive pixel rows, the gradient of the ramp signal RAMP may be switched from one to the other frequently. To avoid this problem, in the case that the gradient of the ramp signal RAMP is R2, when having detected that L consecutive maximum pixel values (L maximum pixel values corresponding to L consecutive pixel rows) are smaller than the threshold Dthb, the resolution control section 107 may switch the level of the overflow detection signal OF from high to low (i.e., may control the reference signal supply section 104 so that the gradient of the ramp signal RAMP be changed from R2 to R1). In this way, by giving the hysteresis characteristic to the overflow determination processing, frequent switching of the gradient of the ramp signal RAMP from one to the other can be suppressed or reduced.

[Color Filter]

Figure 6A:
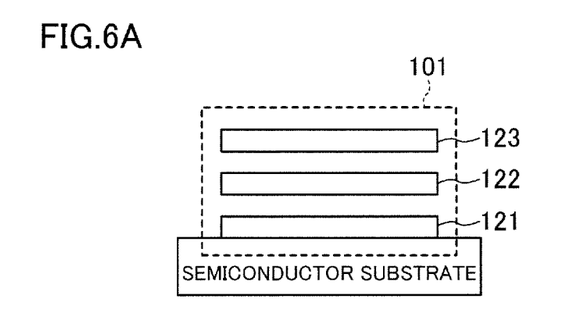
FIG. 6A is a view showing an example configuration of an imaging section.
Figure 6B:
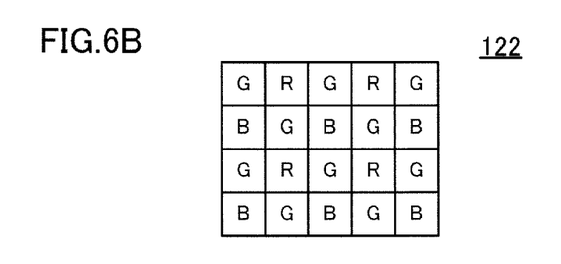
FIG. 6B is a view for explaining a Bayer-array color filter.

As shown in FIG. 6A, the imaging section 101 may further include a color filter 122 formed above a pixel array 121 (the pixels P11 to P23) and an optical low-pass filter 123 formed above the color filter 122. The optical low-pass filter 123 is provided to reduce aliasing (moire) occurring when the pixels P11 to P23 sample incident light. With this provision, the light incident on the pixel array 121 from the optical low-pass filter 123 through the color filter 122 is limited to light having a Nyquist frequency (1/(pixel pitch×2)) or less. The color filter 122 may be a Bayer-array color filter as shown in FIG. 6B. When such a Bayer-array color filter is placed, pixels corresponding to the green (G) component (G pixels) are arranged at regular spacings in the vertical direction, where the spacing of G pixels is (pixel pitch×√2). In the case of allowing light to enter the pixel array 121 through the optical low-pass filter 123, light having a spatial frequency higher than the period of G pixels is not allowed to enter in the vertical direction of the pixel array 121. In other words, when observed pixel row by pixel row, pixels corresponding to the G component can detect light having a higher spatial frequency than pixels corresponding to the R components and the B components. Therefore, the resolution control section 107 may execute the overflow determination processing (i.e., the control of the reference signal supply section 104) based on a pixel value corresponding to the G component among the pixel values D1 to D3 (the pixel values of one pixel row).

[Alteration of Resolution Control Section]

The resolution control section 107 may execute the overflow determination processing for each color component (RGB), or divide the pixel columns arranged in the valid pixel region of the imaging section 101 into a plurality of groups and execute the overflow determination processing for each group. Otherwise, the resolution control section 107 may divide the horizontal OB pixels arranged in the horizontal OB clamp region into a plurality of groups and execute the overflow determination processing for each group. The resolution control section 107 may be implemented as a function of the memory section 106 or as a function of the digital signal processing section 108.

[Gradient of Ramp Signal-1]

The gradients R1 and R2 of the ramp signal RAMP are not limited to the combination described above. For example, the gradient R1 may be set so that the saturation voltage Vmax of the AD conversion sections 1051 to 1053 be expressed by (N+M) bits, and the gradient R2 may be set so that the saturation voltage Vmax be expressed by N bits. In this case, the threshold Dthb is set at a value (1/M) times that of the threshold Dtha. The resolution (bit count) of the AD conversion sections 1051 to 1053 is (N+M) bits when the gradient of the ramp signal RAMP is R1, and N bits when the gradient of the ramp signal RAMP is R2. The signal correction section 11 may output the pixel values D1 to D3 (the pixel values of one pixel row) as they are without correction as the image signal DATA when the gradient of the ramp signal RAMP is R1, and may multiply the pixel values D1 to D3 by "M" and output the result as the image signal DATA when the gradient of the ramp signal RAMP is R2. In this way, the (N+M)-bit image signal DATA can be obtained.

[Gradient of Ramp Signal-2]

Figure 7:
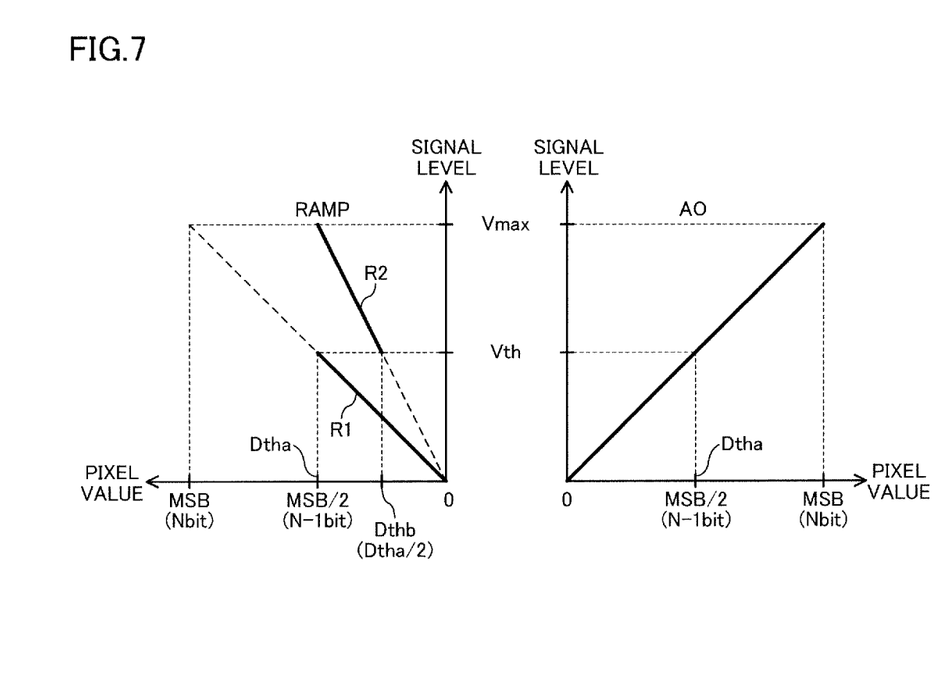
FIG. 7 is a view for explaining gradients of a ramp signal.

Alternatively, as shown in FIG. 7, the gradient R1 may be set so that the saturation voltage Vmax of the AD conversion sections 1051 to 1053 be expressed by N bits, and the gradient R2 may be set so that the saturation voltage Vmax be expressed by (N−1) bits. In this case, the threshold Dtha is set at a half of the maximum resolution (MSB) of the AD conversion sections 1051 to 1053, and the threshold Dthb is set at a half of the threshold Dtha. The resolution (bit count) of the AD conversion sections 1051 to 1053 is N bits when the gradient of the ramp signal RAMP is R1, and (N−1) bits when the gradient of the ramp signal RAMP is R2. The signal correction section 11 may output the pixel values D1 to D3 (the pixel values of one pixel row) as they are without correction as the image signal DATA when the gradient of the ramp signal RAMP is R1, and may multiply the pixel values D1 to D3 by "2" and output the result as the image signal DATA when the gradient of the ramp signal RAMP is R2. In this way, the N-bit image signal DATA can be obtained.

By the above setting, while good S/N is maintained when the signal level of the pixel signals AO1 to AO3 is lower than the threshold voltage Vth (e.g., in low-luminance portions of the pixel signals AO1 to AO3), the time required for the AD conversion sections 1051 to 1053 to perform the AD conversion processing can be shortened when the signal level of the pixel signals AO1 to AO3 is higher than the threshold voltage Vth (e.g., in high-luminance portions of the pixel signals AO1 to AO3).

Second Embodiment

Figure 8:
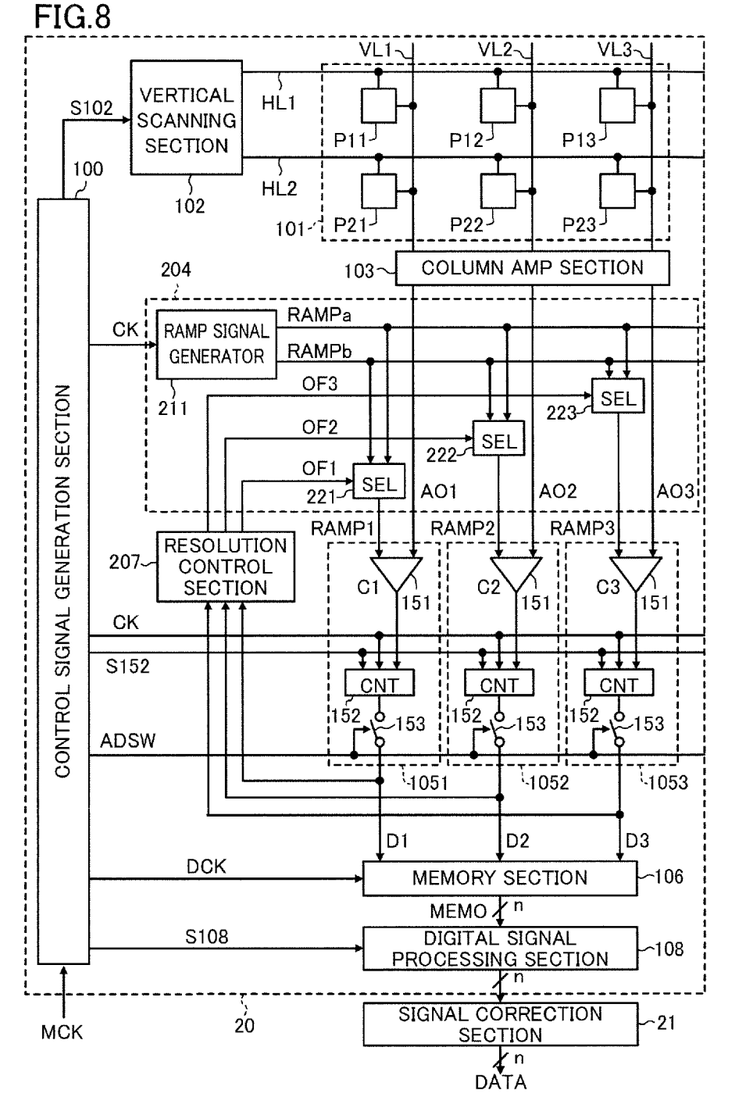
FIG. 8 is a view showing an example configuration of an image processing apparatus of the second embodiment.

FIG. 8 shows a configuration of an image processing apparatus of the second embodiment. The image processing apparatus includes a solid-state imaging apparatus 20 and a signal correction section 21. The solid-state imaging apparatus 20 includes a reference signal supply section 204 and a resolution control section 207 in place of the reference signal supply section 104 and the resolution control section 107 shown in FIG. 1. The other configuration of the solid-state imaging apparatus 20 is substantially the same as that of the solid-state imaging apparatus 10 shown in FIG. 1.

[Reference Signal Supply Section]

The reference signal supply section 204 supplies n (n=3 in the illustrated example) ramp signals RAMP1 to RAMP3 to the n AD conversion sections 1051 to 1053, respectively. Also, the reference signal supply section 204 changes the gradients of the ramp signals RAMP1 to RAMP3 in response to control by the resolution control section 207 (overflow detection signals OF1 to OF3 in the illustrated example). The reference signal supply section 204 includes a ramp signal generator 211 and selectors (SEL) 221 to 223 respectively corresponding to the AD conversion sections 1051 to 1053, for example. The ramp signal generator 211 generates a ramp signal RAMPa and a ramp signal RAMPb (a ramp signal steeper in gradient than the ramp signal RAMPa) in synchronization with the clock CK from the control signal generation section 100. For example, the gradient of the ramp signal RAMPa is R1, and the gradient of the ramp signal RAMPb is R2 (steeper than the gradient R1). The selectors 221 to 223 output either the ramp signal RAMPa or RAMPb as the ramp signals RAMP1 to RAMP3 in response to the overflow detection signals OF1 to OF3, respectively.

[Resolution Control Section]

The resolution control section 207 controls the reference signal supply section 204 in the following manner. For each of the pixel values D1 to D3 (the pixel values of one pixel row) obtained by the AD conversion sections 1051 to 1053, in the case that the gradient of one of the ramp signals RAMP1 to RAMP3 corresponding to the pixel value (e.g., the ramp signal RAMP1 corresponding to the pixel value D1) is R1, when having detected that the pixel value is larger than the preset threshold Dtha, the resolution control section 207 controls the reference signal supply section 204 so that the gradient of the ramp signal corresponding to the pixel value be changed to R2. Also, for each of the pixel values D1 to D3, in the case that the gradient of one of the ramp signals RAMP1 to RAMP3 corresponding to the pixel value is R2, when having detected that the pixel value is smaller than the threshold Dthb (threshold smaller than the threshold Dtha), the resolution control section 207 controls the reference signal supply section 204 so that the gradient of the ramp signal corresponding to the pixel value be changed to R1.

[Overflow Determination Processing]

For example, in the reference signal supply section 204, the selectors 221 to 223 may select the ramp signal RAMPa (ramp signal having the gradient R1) as the ramp signals RAMP1 to RAMP3, respectively, when the level of the overflow detection signals OF1 to OF3 is low, and select the ramp signal RAMPb (ramp signal having the gradient R2) as the ramp signals RAMP1 to RAMP3, respectively, when the level of the overflow detection signals OF1 to OF3 is high. In this case, the resolution control section 207 may perform the following overflow determination processing. First, the resolution control section 207 sets the overflow detection signals OF1 to OF3 at the low level, whereby the gradient of the ramp signals RAMP1 to RAMP3 is set at R1. Then, when having detected that the pixel value D1 is larger than the threshold Dtha, the resolution control section 207 switches the level of the overflow detection signal OF1 from low to high, whereby the gradient of the ramp signal RAMP1 is switched from R1 to R2. Thereafter, when having detected that the pixel value D1 is smaller than the threshold Dthb, the resolution control section 207 switches the level of the overflow detection signal OF1 from high to low, whereby the gradient of the ramp signal RAMP1 is switched from R2 to R1. This also applies to the processing related to the pixel values D2 and D3 and the ramp signals RAMP2 and RAMP3.

In the case that the gradient of the ramp signal RAMP1 is R2, when having detected that L consecutive pixel values D1 (L pixel values D1 corresponding to L consecutive pixel rows) are smaller than the threshold Dthb, the resolution control section 207 may switch the level of the overflow detection signal OF1 from high to low (i.e., may control the reference signal supply section 204 so that the gradient of the ramp signal RAMP1 be switched from R2 to R1). In this way, by giving the hysteresis characteristic to the overflow determination processing, frequent switching of the gradient of the ramp signal RAMP1 from one to the other can be suppressed or reduced. This also applies to the processing related to the pixel values D2 and D3 and the ramp signals RAMP2 and RAMP3.

[Signal Correction Section]

The signal correction section 21 detects which the gradients of the ramp signals RAMP1 to RAMP3 (the gradients of the ramp signals at the time when the pixel values D1 to D3 are obtained) are, R1 or R2, based on the pixel values D1 to D3 (the pixel values of one pixel row) themselves supplied as the image signal MEMO from the solid-state imaging apparatus 20 (specifically, from the digital signal processing section 108). Also, the signal correction section 21 corrects the pixel values D1 to D3 according to the gradients of the ramp signals RAMP1 to RAMP3, and outputs the result as the image signal DATA.

Taking the pixel value D1 as an example and using the case of FIG. 4, the resolution (bit count) of the AD conversion section 1051 is (N+1) bits when the gradient of the ramp signal RAMP1 is R1, and N bits when the gradient of the ramp signal RAMP1 is R2. In this case, when the gradient of the ramp signal RAMP1 is R1, the signal correction section 21 multiplies the pixel value D1 supplied as the image signal MEMO from the solid-state imaging apparatus 20 by "1," and outputs the result as the image signal DATA (i.e., outputs the pixel value D1 as it is as the image data DATA). When the gradient of the ramp signal RAMP1 is R2, the signal correction section 21 multiplies the pixel value D1 supplied as the image signal MEMO from the solid-state imaging apparatus 20 by "2," and outputs the result as the image signal DATA. This also applies to the processing related to the pixel values D2 and D3. In this way, the (N+1)-bit image signal DATA can be obtained.

[Processing by Signal Correction Section]

Figure 9:
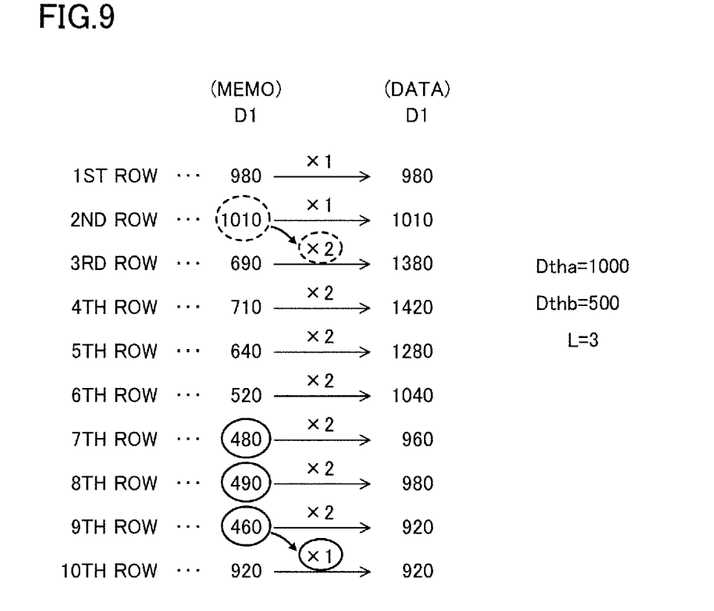
FIG. 9 is a view for explaining correction of pixel values.

Referring to FIG. 9, the processing by the signal correction section 21 will be described. The description will be made herein taking the processing related to the pixel value D1 as an example. Assume that the thresholds Dtha and Dthb are 1000 and 500, respectively. Assume also that, in the case that the gradient of the ramp signal RAMP1 is R2, when having detected that the pixel value D1 is smaller than the threshold Dthb three consecutive times (having detected that the pixel value D1 is smaller than the threshold Dthb in three consecutive pixel rows), the resolution control section 207 controls the reference signal supply section 204 so that the gradient of the ramp signal RAMP1 be switched to R1.

First, the signal correction section 21 multiplies the first-row pixel value D1 (=980) and the second-row pixel value D1 (=1010) by "1" and outputs the results as the image signal DATA. Also, since the second-row pixel value D1 is larger than the threshold Dtha (=1000), the signal correction section 21 detects that the gradient of the ramp signal RAMP1 will be changed to R2 (the resolution of the AD conversion section 1051 will be changed from (N+1) bits to N bits) at the AD conversion processing for the next pixel row (third row), and changes the multiplier coefficient from "1" to "2."

Then, the signal correction section 21 multiplies the third-row pixel value D1 (=690) through the ninth-row pixel value D1 (=460) by "2" and outputs the results as the image signal DATA. Also, since the seventh-row pixel value D1 (=480), the eighth-row pixel value D1 (=490), and the ninth-row pixel value D1 (=460) are smaller than the threshold Dthb (=500), the signal correction section 21 detects that the gradient of the ramp signal RAMP1 will be changed to R1 (the resolution of the AD conversion section 1051 will be changed from N bits to (N+1) bits) at the AD conversion processing for the next pixel row (tenth row), and changes the multiplier coefficient from "2" to "1."

Thereafter, the signal correction section 21 multiplies the tenth-row pixel value D1 (=920) by "1" and outputs the result as the image signal DATA.

Thus, the gradients of the ramp signals RAMP1 to RAMP3 at the time when the pixel values D1 to D3 corresponding to the (x+1)th pixel row are obtained can be detected based on the pixel values D1 to D3 (the pixel values of one pixel row) corresponding to the x-th pixel row themselves.

As described above, while good S/N is maintained when the signal level of the pixel signals AO1 to AO3 is lower than the threshold voltage Vth (e.g., in low-luminance portions of the pixel signals AO1 to AO3), the dynamic range can be expanded when the signal level of the pixel signals AO1 to AO3 is higher than the threshold voltage Vth (e.g., in high-luminance portions of the pixel signals AO1 to AO3).

Also, since the resolution of the AD conversion sections 1051 to 1053 (which the gradients of the ramp signals RAMP1 to RAMP3 are, R1 or R2) can be detected based on the pixel values D1 to D3 themselves, it is unnecessary to provide a signal line for output of resolution information (information on the resolution of the AD conversion sections 1051 to 1053). Thus, the configuration of the solid-state imaging apparatus 20 can be simplified.

[Alterations of Resolution Control Section/Signal Correction Section]

When the imaging section 101 has a valid pixel region, a transient region, invalid regions, vertical OB clamp regions, and a horizontal OB clamp region, the resolution control section 207 may control the reference signal supply section 204 based on a pixel value corresponding to a horizontal OB pixel. In this case, the signal correction section 21 may detect which the gradients of the ramp signals RAMP1 to RAMP3 (the gradients of the ramp signals RAMP1 to RAMP3 at the time when the pixel values D1 to D3 are obtained) are, R1 or R2, based on the pixel value corresponding to the horizontal OB pixel itself among the pixel values D1 to D3 (the pixel values of one pixel row) supplied as the image signal MEMO from the solid-state imaging apparatus 20 (specifically, from the digital signal processing section 108), correct the pixel values D1 to D3 according to the gradients of the ramp signals RAMP1 to RAMP3, and output the results as an image signal DATA.

[Gradient of Ramp Signal]

The gradients (R1 and R2) of the ramp signals RAMPa and RAMPb are not limited to the combination described above. For example, the gradient R1 may be set so that the saturation voltage Vmax of the AD conversion sections 1051 to 1053 be expressed by (N+M) bits, and the gradient R2 may be set so that the saturation voltage Vmax be expressed by N bits. In this case, the threshold Dthb is set at a value (1/M) times that of the threshold Dtha. The signal correction section 21 may output the pixel value D1 as it is without correction as the image signal DATA when the gradient of the ramp signal RAMP1 is R1, and may multiply the pixel value D1 by "M" and output the result as the image signal DATA when the gradient of the ramp signal RAMP1 is R2. This also applies to the processing related to the pixel values D2 and D3. In this way, the (N+M)-bit image signal DATA can be obtained.

Alternatively, the gradient of the ramp signal RAMPa (gradient R1) may be set so that the saturation voltage Vmax of the AD conversion sections 1051 to 1053 be expressed by N bits, and the gradient of the ramp signal RAMPb (gradient R2) may be set so that the saturation voltage Vmax be expressed by (N−1) bits (see FIG. 7). In this case, the threshold Dtha is set at a half of the maximum resolution (MSB) of the AD conversion sections 1051 to 1053, and the threshold Dthb is set at a half of the threshold Dtha. The signal correction section 21 may output the pixel value D1 as it is without correction as the image signal DATA when the gradient of the ramp signal RAMP1 is R1, and may multiply the pixel value D1 by "2" and output the result as the image signal DATA when the gradient of the ramp signal RAMP1 is R2. This also applies to the processing related to the pixel values D2 and D3. In this way, the N-bit image signal DATA can be obtained.

(Digital Camera)

Figure 10:
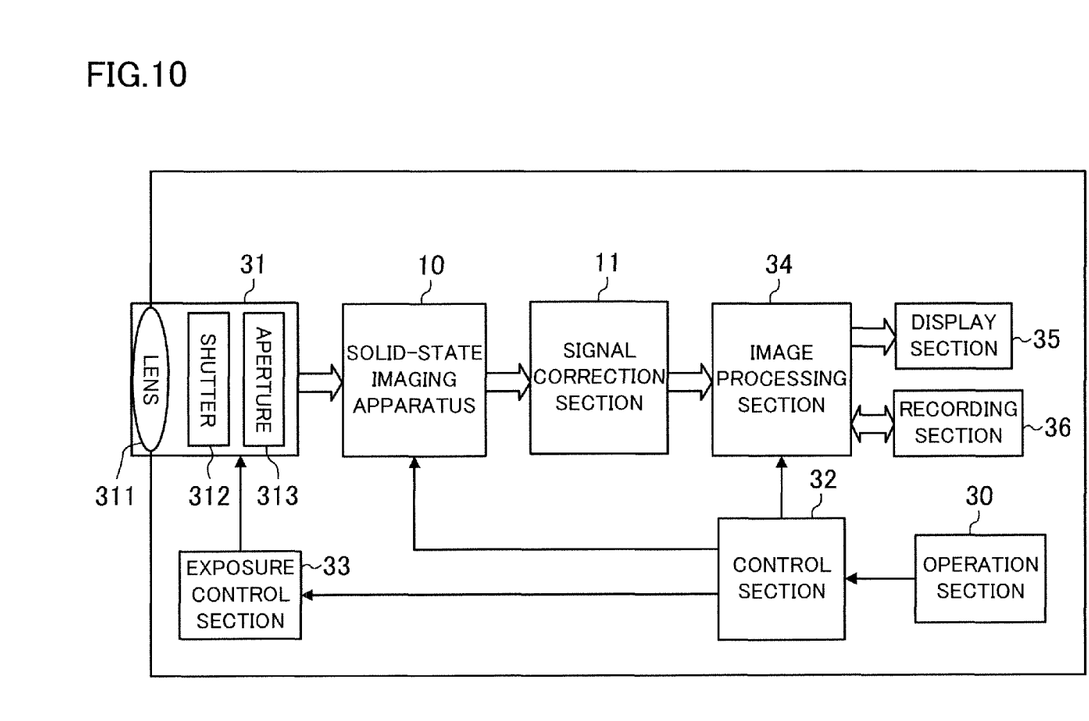
FIG. 10 is a view showing an example configuration of a digital camera.

As shown in FIG. 10, the solid-state imaging apparatuses 10 and 20 and the signal correction sections 11 and 21 shown in FIGS. 1 and 8 are applicable to digital cameras.

The digital camera shown in FIG. 10 includes an operation section 30, an optical section 31, a control section 32, an exposure control section 33, an image processing section 34, a display section 35, a recording section 36, etc. in addition to the solid-state imaging apparatus 10 and the signal correction section 11 shown in FIG. 1. The optical section 31 includes a lens 311 that permits an optical image of an object to be formed on an imaging device (the imaging section 101 of the solid-state imaging apparatus 10), a shutter 312 that adjusts the time during which light is taken into the imaging device, an aperture 313 that adjusts the amount of light reaching the imaging device, etc. The control section 32 controls the solid-state imaging apparatus 10, the exposure control section 33, and the image processing section 34 in response to an operation given to the operation section 30. The control section 32 may control the solid-state imaging apparatus 10 via a communication means such as a serial I/F. The exposure control section 33 controls the optical section 31 so that an image supplied to the image processing section 34 be kept at an appropriate brightness. For example, the exposure control section 33 adjusts the focusing position of the lens 311 to ensure that the optical image of an object be formed on the imaging device. The image processing section 34 performs correction processing (OB correction, gamma correction, knee correction, white balance, noise reduction, etc.), YC processing, image compression processing, etc. for the image signal from the signal correction section 11. The display section 35 displays an image based on the image signal processed by the image processing section 34. The recording section 36 records the image signal processed by the image processing section 34.

In general, in the image processing section 34, low-luminance portions of the image signals AO1 to AO3 are amplified while high-luminance portions thereof are compressed. Therefore, by increasing the resolution of the low-luminance portions of the image signals AO1 to AO3 in the solid-state imaging apparatus 10, the S/N of the signal components amplified in the image processing section 34 can be improved, and thus the image quality can be enhanced.

As described above, the aforementioned solid-state imaging apparatus having a simple configuration can expand the dynamic range while maintaining good S/N, and thus is useful for camera systems such as digital cameras, camera-equipped cellular phones, and monitor cameras.

It is to be understood that the aforementioned embodiments are essentially preferred illustrations, and by no means intended to restrict the present disclosure, applications thereof, or the range of the uses thereof.

What is claimed is:

1. A solid-state imaging apparatus, comprising:
an imaging section having n×m pixels arranged in a matrix each configured to store a charge corresponding to incident light, the imaging section outputting, every pixel row of the n×m pixels, n pixel signals corresponding to charges stored in n pixels belonging to the pixel row;
a reference signal supply section configured to supply a ramp signal and capable of changing the gradient of the ramp signal;
n AD conversion sections corresponding to n pixel columns of the n×m pixels, each configured to count the time taken until the signal level of the ramp signal from the reference signal supply section reaches the signal level of the pixel signal from the corresponding pixel column, thereby converting the pixel signal to a pixel value; and
a resolution control section configured to control the reference signal supply section so that, in the case that the gradient of the ramp signal is a first gradient, the gradient be changed to a second gradient steeper than the first gradient when having detected a pixel value larger than a first threshold among the n pixel values obtained by the n AD conversion sections, and control the reference signal supply section so that, in the case that the gradient of the ramp signal is the second gradient, the gradient be changed to the first gradient when having detected that the maximum pixel value among the n pixel values obtained by the n AD conversion sections is smaller than a second threshold that is smaller than the first threshold.

2. The solid-state imaging apparatus of claim 1, wherein the imaging section has a Bayer-array color filter,
the resolution control section controls the reference signal supply section based on a pixel value corresponding to a green (G) component among the n pixel values.

3. The solid-state imaging apparatus of claim 1, wherein
the n×m pixels include an OB pixel, and
a pixel value corresponding to the OB pixel is output as information indicating which the gradient of the ramp signal is, the first gradient or the second gradient.

4. An image processing apparatus comprising:
the solid-state imaging apparatus of claim 1; and
a signal correction section configured to detect which the gradient of the ramp signal is, the first gradient or the second gradient, based on a specific pixel value among the n pixel values obtained by the solid-state imaging apparatus, and correct the n pixel values according to the gradient of the ramp signal.

5. An image processing apparatus comprising:
the solid-state imaging apparatus of claim 3; and
a signal correction section configured to detect which the gradient of the ramp signal is, the first gradient or the second gradient, based on the pixel value corresponding to the OB pixel obtained by the solid-state imaging apparatus, and correct the n pixel values according to the gradient of the ramp signal.

6. A solid-state imaging apparatus, comprising:
an imaging section having n×m pixels arranged in a matrix each configured to store a charge corresponding to incident light, the imaging section outputting, every pixel row of the n×m pixels, n pixel signals corresponding to charges stored in n pixels belonging to the pixel row;
a reference signal supply section configured to supply n ramp signals and capable of changing the gradient of each of the n ramp signals;
n AD conversion sections corresponding to n pixel columns of the n×m pixels, each configured to count the time taken until the signal level of the corresponding ramp signal among the n ramp signals reaches the signal level of the pixel signal from the corresponding pixel column, thereby converting the pixel signal to a pixel value; and
a resolution control section configured to control the reference signal supply section for each of the n AD conversion sections so that, in the case that the gradient of the ramp signal corresponding to the AD conversion section is a first gradient, the gradient be changed to a second gradient steeper than the first gradient when having detected that the pixel value obtained by the AD conversion section is larger than a first threshold, and control the reference signal supply section so that, in the case that the gradient of the ramp signal corresponding to the AD conversion section is the second gradient, the gradient be changed to the first gradient when having detected that the pixel value obtained by the AD conversion section is smaller than a second threshold that is smaller than the first threshold.

7. An image processing apparatus comprising:
the solid-state imaging apparatus of claim 6; and
a signal correction section configured to detect which the gradients of the n ramp signals are, the first gradient or the second gradient, based on the n pixel values obtained by the solid-state imaging apparatus, and correct the n pixel values according to the gradients of the n ramp signals.

8. A camera system comprising:
the image processing apparatus of claim 4; and
an optical section configured to form an optical image of an object on the imaging section.

9. A solid-state imaging apparatus, comprising:
an imaging section having n×m pixels arranged in a matrix each configured to store a charge corresponding to incident light, the imaging section outputting, every pixel row of the n×m pixels, n pixel signals corresponding to charges stored in n pixels belonging to the pixel row;
n AD conversion sections corresponding to n pixel columns of the n×m pixels, each configured to convert the pixel signal from the corresponding pixel column to a pixel value and capable of changing AD conversion resolution; and
a resolution control section configured to control the n AD conversion sections so that, in the case that the AD conversion resolution of the n AD conversion sections is a first resolution, the AD conversion resolution be changed to a second resolution rougher than the first resolution when having detected a pixel value larger than a first threshold among the n pixel values obtained by the n AD conversion sections, and control the n AD conversion sections so that, in the case that the AD conversion resolution of the n AD conversion sections is a second resolution, the AD conversion resolution be changed to the first resolution when having detected that the maximum pixel value among the n pixel values obtained by the n AD conversion sections is smaller than a second threshold that is smaller than the first threshold.

10. A camera system comprising:
the image processing apparatus of claim 5; and
an optical section configured to form an optical image of an object on the imaging section.

11. A camera system comprising:
the image processing apparatus of claim 7; and
an optical section configured to form an optical image of an object on the imaging section.

* * * * *